United States Patent [19]
Hayashi et al.

[11] Patent Number: 5,609,554
[45] Date of Patent: Mar. 11, 1997

[54] CONDUCTIVE ROLL

[75] Inventors: Saburou Hayashi; Keita Shiraki; Takafumi Yamamoto, all of Kasugai, Japan

[73] Assignee: Tokai Rubber Industries, Ltd., Japan

[21] Appl. No.: 416,638

[22] Filed: Apr. 5, 1995

[30] Foreign Application Priority Data

Apr. 22, 1994 [JP] Japan .................. 6-084692

[51] Int. Cl.$^6$ .................................. G03G 15/20
[52] U.S. Cl. ............................. 492/56; 492/53
[58] Field of Search .............. 492/53, 56; 355/259; 428/620

[56] References Cited

U.S. PATENT DOCUMENTS

| | | | |
|---|---|---|---|
| 4,257,699 | 3/1981 | Lentz | 492/56 |
| 4,505,573 | 3/1985 | Brewington et al. | 492/56 |
| 4,827,868 | 5/1989 | Tarumi et al. | 492/54 |
| 4,876,777 | 10/1989 | Chow | 492/56 |
| 5,123,151 | 6/1992 | Uehara et al. | 492/56 |
| 5,292,562 | 3/1994 | Fitzgerald et al. | 492/56 |
| 5,292,606 | 5/1994 | Fitzgerald | 492/56 |
| 5,312,662 | 5/1994 | Ohta et al. | 492/56 |
| 5,324,885 | 6/1994 | Koga et al. | 492/56 |
| 5,336,539 | 8/1994 | Fitzgerald | 492/56 |
| 5,403,995 | 4/1995 | Kishino et al. | 492/56 |
| 5,424,815 | 6/1995 | Koga et al. | 492/53 |
| 5,458,937 | 10/1995 | Nakamura et al. | 492/56 |
| 5,468,531 | 11/1995 | Kikukawa et al. | 492/56 |
| 5,474,821 | 12/1995 | Kass | 492/56 |

FOREIGN PATENT DOCUMENTS 2-311868  12/1990  Japan .

Primary Examiner—Irene Cuda
Attorney, Agent, or Firm—Parkhurst, Wendel & Burr, L.L.P.

[57] ABSTRACT

A conductive roll including a conductive shaft, a conductive rubber foam layer formed on an outer circumferential surface of the conductive shaft, and a semi-conductive solid rubber layer formed on an outer circumferential surface of the conductive rubber foam layer. The conductive roll is produced by forming a cylindrical laminar body which gives the conductive rubber foam layer and semi-conductive solid rubber layer, and simultaneously vulcanizing and foaming the laminar body in a mold in which the conductive shaft is placed in position.

15 Claims, 5 Drawing Sheets

CONDUCTIVE ROLL

BACKGROUND OF THE INVENTION

1. Field of the Invention

The present invention relates to an electrically conductive roll which is particularly favorably used as a charging roll or an image developing roll for an electrophotographic copying machine, printer or the like. This invention is also concerned with a method of producing such a conductive roll as described above.

2. Discussion of Related Art

An electrically conductive roll, such as a charging roll or an image developing roll used in an electrophotographic copying machine, facsimile machine or the like, has been desired to meet the following requirements: (1) the roll can be held in good contact with a photosensitive drum, (2) the photosensitive drum is not contaminated by a softener which oozes or comes out onto the outer surface of the roll, (3) the electric resistance of the roll is suitably controlled, and (4) the roll has relatively small tackiness and is less likely to stick to the photosensitive drum.

To fulfill all the above requirements, an electrically conductive roll as shown in FIG. 6 has been proposed by the assignee of the present application in laid-open Publication No. 2-311868 of unexamined Japanese Patent Application. As is apparent from FIG. 6, the conductive roll 42 has an electrically conductive shaft 44, and a base layer 46 which is formed on the outer circumferential surface of the shaft 44 and is made of an electrically conductive, elastic material. On the outer circumferential surface of the base layer 46, there are formed by coating a softener-preventing layer 48 (which will be described later), a resistance adjusting layer 50 formed of a particular semi-conductive rubber, and a protective layer 52 formed of a semi-conductive resin, in the order of description. The preventive layer 48 is formed of a suitable conductive resin which contains an electron-conductive material.

In the conductive roll 42 constructed as described above, the conductive elastic material for the base layer 46 contains a suitable softener which serves to lower the hardness of the base layer 46, and thus advantageously enhance contact between the roll 42 and a photosensitive drum (not shown). The softener-preventing layer 48 formed on the outer surface, of the base layer 46 serves to prevent the softener contained in the base layer 46 from oozing or migrating onto the outer surface of the roll 42, thereby to effectively avoid contamination of the photosensitive drum. The above-indicated resistance adjusting layer 50 is formed of a conductive material having a volume resistivity which is held in a suitable range such that the electrical resistance of the roll is desirably controlled within an appropriate range. Further, the protective layer 42 as the outermost layer of the roll 42 effectively prevents the roll 42 from sticking to the photosensitive drum which the roll 42 is to be pressed against and held in contact with. Thus, in the conductive roll 42 as disclosed in the above-identified publication, the four individual layers 46, 48, 50, 52 formed of different materials are stacked or laminated integrally into a tube formed on the outer circumferential surface of the shaft 44, so that the resulting roll 42 satisfactorily meets all the requirements (1) through (4) as described above.

As well known in the art, when a voltage is applied to a charging roll as one type of the conductive roll while the roll is being pressed against and held in contact with a photosensitive drum, the photosensitive drum vibrates due to force which acts between the charging roll and the photosensitive drum upon changes in the frequency of AC fields. When the charging roll is used in a high-speed copying machine, printer or the like which performs its copying or printing operation at a high speed, in particular, the vibration of the drum is increased so much as to cause undesirable noise. Therefore, the conductive roll, particularly the charging roll, is required to have an excellent vibration absorbing characteristic, as well as the above-described characteristics. The conductive roll having all the required characteristics is capable of absorbing the vibration of the photosensitive drum, and easily and effectively avoiding the noise.

To deal with the vibration which takes place between the conductive roll and the photosensitive roll and causes noises, the above-identified publication proposes that a relatively large amount of softener be contained in the base layer 46 to reduce the hardness of the layer 46, so as to effectively prevent the vibration as described above. However, the thus obtained conductive roll 42 inevitably suffers from an increased amount of the softener which oozes out of the roll 42 due to the large content of the softener in the base layer 46.

The oozing of the softener may be prevented to some extent by increasing the thickness of the softener-preventing layer 48 of the conductive roll 42. However, the increase in the thickness of the softener-preventing layer 48 causes other problems during the process of forming the layer 48 by coating, for example, sagging of a coating liquid which forms the softener-preventing layer 48. Thus, the conductive roll 42 as disclosed in the above publication still has some room for improvement in terms of its vibration absorbing characteristic.

The conductive roll 42 exhibits the above-described excellent characteristics due to provision of the softener-preventing layer 48, resistance adjusting layer 50 and protective layer 52 on the outer surface of the base layer 46 formed on the outer surface of the shaft 44. Since these three layers 48, 50, 52 are formed by coating on the base layer 46, the conductive roll 42 suffers from various problems in terms of its product capability or performance and the process of manufacturing the roll 42.

More specifically, in order to achieve the uniform thickness of each of the coating layers 48, 50, 52 of the conductive roll 42 in the circumferential direction thereof, the coating operation is effected while a base roll consisting of the shaft 44 and the base layer 46 is being supported so as to stand upright. During this coating operation, sagging of a coating liquid which gives each of the layers 48, 50, 52 inevitably takes place, whereby the thickness of each coating layer 48, 50, 52 is undesirably increased in the direction from one axial end thereof toward the other end. If the coating liquid sags excessively, a clearance or gap appears between the obtained conductive roll 42 and the photosensitive drum, resulting in uneven charging of the drum. Further, corona discharge may take place exclusively at the clearance between the roll 42 and the photosensitive drum, and a portion of the photosensitive drum which corresponds to the clearance may wear faster than the other portions in a long period of use, whereby the electrical resistance of the photosensitive drum is lowered. As a result, an abnormal discharge may take place upon application of a low voltage. In an extreme case, the image reproduced by the conductive roll has a low copy quality, that is, lines undesirably appear as a part of the reproduced image in the transverse direction of the copy sheet.

In producing this conductive roll 42, a solvent is used in the above-described coating operation for dissolving a suitable rubber material or resin material. The use of the solvent requires considerable concern for safety, and also causes bubbles and cissing or crawling to appear on the coating layers 48, 50, 52. To enhance yield of the conductive roll 42, the temperature, humidity, gas volume or quantity for drying the coating layers 48, 50, 52 need to be considerably accurately controlled. Moreover, there is a limit to the material used for each of the coating layers 48, 50, 52, which is selected depending upon a specific kind of the solvent used for dissolving the material.

Where a granular electron-conductive material is added to the material for any of the coating layers 48, 50, 52 of the conductive roll 42, the coating liquid including the conductive material must be constantly stirred during the coating operation, so as to reduce a variation of the electrical resistance in the coating layer 48, 50, 52. It necessitates bulky equipment which is capable of effecting the coating while stirring the coating liquid.

In the conductive roll 42 as disclosed in the above-identified publication, the resistance adjusting layer 50 is required to have a relatively large thickness of about 100–200 μm, so as to assure an increased resistance to leak (leakage of electric current). Since such a resistance adjusting layer 50 cannot be formed by one coating cycle without causing sagging of the coating liquid as described above, the coating cycle must be repeated many times to gradually increase the thickness of the resistance adjusting layer 50. Further, the viscosity of the coating liquid must be also controlled so as to assure high uniformity in the thickness of the layer 50. These requirements eventually make the process of forming the three coating layers including the resistance adjusting layer 50 extremely cumbersome and low efficient.

Moreover, the conductive roll 42 has C-shaped or R-shaped axially opposite ends so as to avoid spark discharge at the axial end faces thereof. Therefore, the thickness of each of the coating layers 48, 50, 52 is locally reduced due to the surface tension of the coating liquid, at a point of inflection formed at the boundary of the axial end portions of the roll 42 and its axially middle portion. Accordingly, the resultant roll 42 inevitably includes a portion having a relatively small thickness even if the thickness of the resistance adjusting layer 50 is accurately controlled by the cumbersome process as described above. This results in high possibility of leakage of electric current due to discharge breakdown occurring at the small-thickness portion of the roll 42.

SUMMARY OF THE INVENTION

It is therefore a first object of the present invention to provide a conductive roll which has significantly reduced hardness without relying much on a softener, assuring an effectively improved vibration absorbing characteristic.

It is a second object of the invention to provide a method of producing such a conductive roll with ease and safety, without suffering from the above-described problems encountered in the conventional method. The conductive roll thus produced exhibits high and stable operating capability or performance when installed in a printer or the like.

It is a third object of the invention to provide a method of producing a roll with ease and safety, which roll exhibits excellent operating capability.

The above first object may be accomplished according to a first aspect of the present invention, which provides a conductive roll comprising a conductive shaft, a conductive rubber foam layer formed on an outer circumferential surface of the conductive shaft, and a semi-conductive solid rubber layer formed on an outer circumferential surface of the conductive rubber foam layer.

The conductive roll constructed as described above has significantly reduced hardness without using a large amount of a softener, assuring a good contact with a photosensitive drum. Thus, the conductive roll has an effectively improved vibration absorbing characteristic, and does not suffer from noise.

In one preferred form of the first aspect of the invention, the conductive roll further includes a semi-conductive thermoplastic resin layer formed by coating on an outer surface of the semi-conductive solid rubber layer. This semi-conductive thermoplastic resin layer is made principally of a composition which contains a thermoplastic resin containing conductive particles dispersed therein, or the thermoplastic resin further containing a crosslinking agent.

In another preferred form of the invention, the conductive rubber foam layer contains conductive particles and has a volume resistivity of not greater than $10^6$ Ωcm.

In a further preferred form of the invention, the semi-conductive solid rubber layer contains an ion-conductive material, and a volume resistivity of $10^5$ Ωcm–$10^{10}$ Ωcm.

The above-identified first object may be accomplished according to a second aspect of the present invention, which provides a conductive roll comprising a conductive shaft, a semi-conductive rubber foam layer formed on an outer circumferential surface of the conductive shaft, a conductive solid rubber layer formed on an outer circumferential surface of the semi-conductive rubber foam layer, and a semi-conductive solid rubber layer formed on an outer circumferential surface of the conductive solid rubber layer.

In one preferred form of the second aspect of the invention, the conductive roll further includes a semi-conductive thermoplastic resin layer formed by coating on an outer surface of the semi-conductive solid rubber layer. This semi-conductive thermoplastic resin layer is made principally of a composition which contains a thermoplastic resin containing conductive particles dispersed therein, or the thermoplastic resin further containing a crosslinking agent.

In another preferred form of the invention, the semi-conductive rubber foam layer contains an ion-conductive material, and a volume resistivity of $10^6$ Ωcm–$10^9$ Ωcm.

In a further preferred form of the invention, the conductive solid rubber layer contains conductive particles, and has a volume resistivity of not greater than $10^6$ Ωcm.

In a still further preferred form of the invention, the semi-conductive rubber layer contains an ion-conductive material, and a volume resistivity of $10^6$ Ωcm–$10^{10}$ Ωcm.

The above-indicated second object of the invention may be accomplished according to a third aspect of the present invention, which provides a method of producing a conductive roll including a conductive shaft, a conductive rubber foam layer formed on an outer circumferential surface of the conductive shaft, and a semi-conductive solid rubber layer formed on an outer circumferential surface of the conductive rubber foam layer, comprising the steps of: (a) positioning the conductive shaft in a cavity of a cylindrical mold, (b) forming a cylindrical laminar body which has an inner layer consisting of an unvulcanized, unfoamed rubber layer that gives the conductive rubber foam layer, and an outer layer consisting of an unvulcanized, non-foaming rubber layer that gives the semi-conductive solid rubber layer, the laminar body having an inside diameter which is larger than an outside diameter of the conductive shaft, and an outside diameter which is smaller than an inside diameter of the cavity of the cylindrical mold; (c) disposing the laminar body coaxially with the conductive shaft in the cavity of the cylindrical mold; and (d) vulcanizing the unvulcanized, unfoamed rubber layer and the unvulcanized, non-foaming rubber layer and foaming the unvulcanized, unfoamed rubber layer at the same time.

According to the above-described method, the conductive roll having high and stable operating capability can be easily and safely produced without causing the conventional problems as described above.

Preferably, the cylindrical laminar body is formed by concurrently extruding a conductive rubber composition and a semi-conductive rubber composition so as to form the unvulcanized, unfoamed rubber layer and the unvulcanized, non-foaming rubber layer, respectively.

The above second object may be accomplished according to a fourth aspect of the present invention, which provides a method of producing a conductive roll including a conductive shaft, a semi-conductive rubber foam layer formed on an outer circumferential surface of the conductive shaft, a conductive solid rubber layer formed on an outer circumferential surface of the semi-conductive rubber foam layer, and a semi-conductive solid rubber layer formed on an outer circumferential surface of the conductive solid rubber layer, comprising the steps of: (a) positioning the conductive shaft in a cavity of a cylindrical mold; (b) forming a cylindrical laminar body which has an inner layer consisting of an unvulcanized, unfoamed rubber layer that gives the semi-conductive rubber foam layer, an intermediate layer consisting of an unvulcanized, non-foaming conductive rubber layer that gives the conductive solid rubber layer, and an outer layer consisting of an unvulcanized, non-foaming semi-conductive rubber layer that gives the semi-conductive solid rubber layer, the laminar body having an inside diameter which is larger than an outside diameter of the conductive shaft, and an outside diameter which is smaller than an inside diameter of the cavity of the cylindrical mold; (c) disposing the laminar body coaxially with the conductive shaft in the cavity of the cylindrical mold; and (d) vulcanizing the unvulcanized, unfoamed rubber layer, the unvulcanized, non-foaming conductive ribber layer and the unvulcanized, non-foaming semi-conductive rubber layer of the cylindrical laminar body and foaming the unvulcanized, unfoamed rubber layer at the same time.

Preferably, the cylindrical laminar body is formed by concurrently extruding a semi-conductive rubber composition which gives the unvulcanized, unfoamed rubber layer, a conductive rubber composition which gives the unvulcanized, non-foaming conductive rubber layer, and a semi-conductive composition which gives the unvulcanized, non-foaming semi-conductive rubber layer.

The above-indicated third object may also be attained according to a fifth aspect of the present invention, which provides a method of producing a roll including a shaft, an elastic foam layer formed on an outer circumferential surface of the shaft, at least one elastic solid layer formed on an outer circumferential surface of the elastic foam layer, comprising the steps of: (a) positioning the shaft in a cavity of a cylindrical mold; (b) forming a cylindrical laminar body which has an inner layer consisting of an unvulcanized, unfoamed elastic layer that gives the elastic foam layer, and an outer layer consisting of at least one unvulcanized, non-foaming elastic layer that gives the elastic solid layer or layers, the laminar body having an inside diameter which is larger than an outside diameter of the shaft, and an outside diameter which is smaller than n inside diameter of the cavity of the cylindrical mold; (c) disposing the laminar body coaxially with the shaft; and (d) vulcanizing the unvulcanized, unfoamed elastic layer and at least one unvulcanized, non-foaming elastic layer, and foaming the unvulcanized, unfoamed elastic layer at the same time.

Preferably, the cylindrical laminar body is formed by concurrently extruding a composition which gives the unvulcanized, unfoamed elastic layer, and at least one composition which gives the above-indicated at least unvulcanized, non-foaming elastic layer.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which.

DETAILED DESCRIPTION OF PREFERRED EMBODIMENTS

Figure 1:
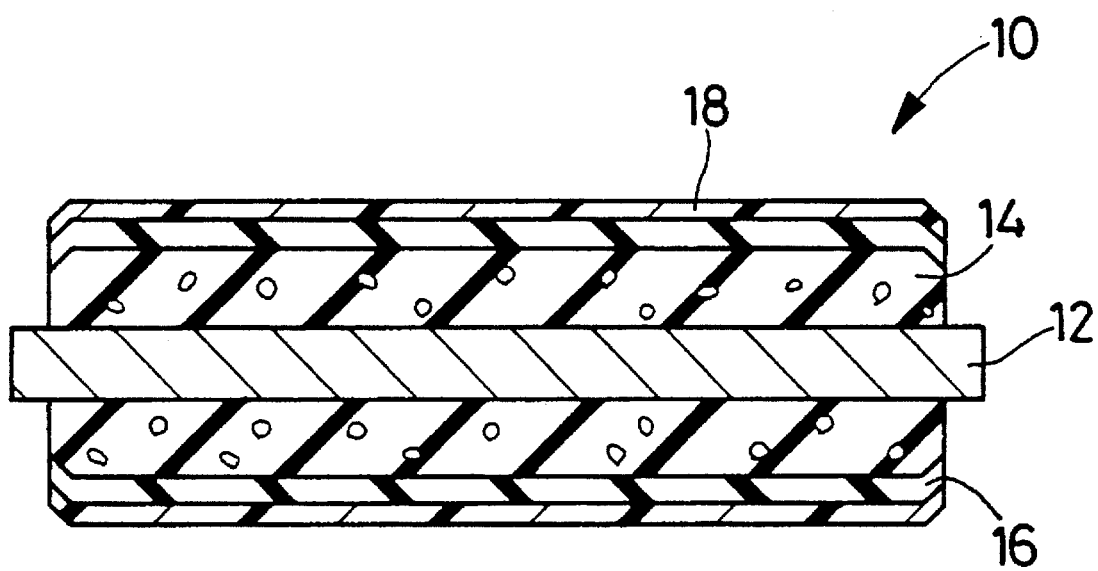
FIG. 1 is an axial cross-sectional view showing one embodiment of a conductive roll of the present invention.

Referring first to FIG. 1, a conductive roll 10 as one preferred embodiment of the present invention includes an electrically conductive shaft 12, an electrically conductive, rubber foam layer 14 formed on the outer circumferential surface of the shaft 12, and a semi-conductive solid rubber layer 16 formed on the outer circumferential surface of the foam layer 14.

The conductive shaft 12 located at the axis of the conductive roll 10 has a columnar shape, and is formed of a known material, such as metals including iron, aluminum and various kinds of stainless steel, and electrically conductive synthetic resins. When the conductive shaft 12 is formed of iron, the outer circumferential surface of the shaft 12 is plated with a suitable material as needed.

The conductive rubber foam layer 14 formed on the outer surface of the conductive shaft 12 constitutes a base layer of the conductive roll 10. This foam layer 14 is formed of a conductive rubber composition which principally consists of a mixture of a suitable rubber material, conductive particles and a foaming agent. More specifically, the rubber material may consist solely of natural rubber, or a synthetic rubber selected from styrene-butadiene rubber, ethylene-propylene rubber, butadiene rubber, chloroprene rubber, nitrile rubber, butyl rubber, Hypalon, acrylic rubber, fluorinated rubber, silicone rubber and isoprene rubber, or may be a mixture of two or more of the above-indicated rubbers. The selected rubber material is mixed with the conductive particles, such as carbon black, graphite, metal powder, or conductive metal oxide (e.g., stannic oxide, titanium oxide or zinc oxide), and further with an organic foaming agent, such as dinitroso pentamethylene tetramine, azodicarbonamide, azobisisobutyronitrile, 4,4'-hydroxybisbenzene, p-toluene sulfonyl-hydrazone, or an inorganic foaming agent such as sodium bicarbonate. The thus prepared conductive rubber composition may further contain as needed suitable amounts of various known compounding agents or additives, such as a vulcanizing agent, vulcanizing aid, softener, filler and processing agent.

The conductive rubber foam layer 14 prepared from the above-described rubber composition containing the conductive particles is provided with a desired electrical conductivity. Further, the above rubber composition containing the foaming agent provides a foam body having an effectively reduced hardness as the rubber foam layer 14, and thus eliminates a need to use a large amount of softener for achieving sufficiently low hardness.

The contents of the foaming agent and the conductive particles in the rubber composition for the conductive rubber foam layer 14 are suitably determined depending upon desired hardness and electrical characteristics of the conductive roll 10. In this embodiment, the amount of the conductive particles is desirably determined so that the volume resistivity of the rubber foam layer 14 is not greater than $10^6$ $\Omega$cm, so as to achieve high uniformity of the electrical characteristics of the conductive rubber layer 14.

The semi-conductive rubber layer 16 formed integrally on the outer surface of the above-described conductive rubber foam layer 14 is formed of a semi-conductive rubber composition which principally consists of a mixture of a suitable rubber material and conductive particles (an electron-conductive agent), or a mixture of a suitable rubber material and an ion-conductive material.

More specifically, the rubber material to be mixed with the conductive particles to provide the semi-conductive rubber composition may consist solely of natural rubber, or a synthetic rubber selected from styrene-butadiene rubber, ethylene-propylene rubber, butadiene rubber, chloroprene rubber, nitrile rubber, butyl rubber, Hypalon, acrylic rubber, fluorinated rubber, silicone rubber or isoprene rubber, or may be a mixture of two or more of the above-indicated rubbers. The selected rubber material is mixed with the conductive particles, such as carbon black, graphite, or metal powder. On the other hand, the rubber material to be mixed with the ion-conductive material may consist solely of a synthetic rubber selected from epichlorohydrin-ethylene oxide rubber, nitrile rubber, propylene oxide rubber, polyether-type urethane rubber and acrylic rubber, or may be a mixture of two or more of the above-indicated rubbers. The selected rubber material is mixed with the ion-conductive material which is selected from among quaternary ammonium salts, such as trimethyloctadecyl ammonium perchlorate and benzyltrimethyl ammonium chloride, and structural charge specific anions, such as lithium perchlorate and potassium perchlorate. It is to be understood that the semi-conductive rubber composition for the rubber layer 16 may further contain suitable amounts of various known compounding agents and additives, as needed.

The semi-conductive rubber layer 16 prepared from the above semi-conductive rubber composition exhibits excellent flexibility due to the use of the rubber material as a major component. The semi-conductive rubber layer 16 also contains the conductive particles or ion-conductive material for giving the layer 16 semi-conductivity, and thus effectively functions as a resistance adjusting layer of the conductive roll 10. The amount of the conductive particles or ion-conductive material contained in the rubber composition is desirable controlled so that the semi-conductive rubber layer 16 has a volume resistivity in the range of $10^6$ –$10^{10}$ $\Omega$cm. Consequently, the semi-conductive rubber layer 16 provides a uniform electrical resistance over its entire surface area, and thus exhibits enhances electrical characteristics required for the layer 16 to serve as the resistance adjusting layer. Where the semi-conductive rubber layer 16 contains the ion-conductive material which makes the layer 16 ion-conductive, the obtained conductive roll 10 does not suffer from an increase in the hardness thereof due to the use of the conductive particles, and thus advantageously exhibits relatively low hardness.

Thus, the electrical resistance of the conductive roll 10 according to the present invention is controlled to within an appropriate range due to the provision of the semi-conductive rubber layer 16 as the resistance adjusting layer, whereby the conductive roll 10 exhibits excellent voltage resistance or leak resistance. Further, the conductive rubber foam layer 14 which consists of a rubber foam body provides the base layer which bears thereon the resistance adjusting layer, and the base layer exhibits a significantly reduced hardness without relying much on the softener. Thus, the amount of the softener contained in the base layer can be considerably reduced, as compared with that of the conventional roll, and the thus reduced softener is not likely to ooze or come out of the base layer. Consequently, the present conductive roll 10 can be held in good contact with the photosensitive drum without suffering from problems, such as contamination of the drum or sticking of the roll to the drum, which would be otherwise caused by oozing of the softener. The present conductive roll 10 also has a significantly improved vibration absorbing characteristic, and does not suffer from noise during its operation.

Since both the base layer and the resistance adjusting layer in the form of the conductive rubber foam layer 14 and the semi-conductive solid rubber layer 16 are formed of rubber compositions which contain a rubber material as a major component, the base and resistance adjusting layers can be concurrently formed by vulcanizing those layers at the same time. The formation of these two layers in this manner does not involve the conventional problem that the semi-conductive rubber layer formed on the outer surface of the conductive rubber foam layer is broken or damaged due to the volume expansion of the foam layer upon foaming of the material which gives the foam layer.

Preferably, the conductive roll 10 according to the present invention further includes a semi-conductive thermoplastic resin layer 18 which serves as a protective layer, as shown in FIG. 1. This thermoplastic resin layer 18 is formed by coating on the outer circumferential surface of the semi-conductive rubber layer 16, and is made of a thermoplastic resin in which conductive particles are dispersed, or a composition prepared by mixing the thermoplastic resin with a crosslinking agent.

More specifically, the semi-conductive thermoplastic resin layer 18 is formed of a resin composition that is prepared by mixing conductive particles by dispersion with a thermoplastic resin, such as 8-nylon, butyral, urethane, copolymer of 4-ethylene fluoride, vinylidene fluoride, or copolymer of 4-ethylene fluoride and vinylidene fluoride and hexafluoropropylene. The conductive particles may be selected from carbon black and various conductive metal oxides, such as stannic oxide, titanium oxide and zinc oxide. This resin composition may further contain a known crosslinking agent, such as that containing isocyanate. It is to be understood that various known compounding agents may be added as needed to the resin composition thus prepared.

In the conductive roll 10 as described above, the semi-conductive thermoplastic resin layer 18 formed of the above-described material serves as a protective layer which effectively prevents the components of the semi-conductive rubber layer 16 formed inside the resin layer 18 from coming out onto the roll surface and contaminate the photosensitive drum. This thermoplastic resin layer 18 also prevents the conductive roll 10 from sticking to the photosensitive drum when the roll 10 is held in pressed contact with the drum for a long period of time. The conductive thermoplastic resin layer 18 is formed by coating with a considerably small thickness of several microns to several tens of microns, without increasing the hardness of the roll 10. When the semi-conductive thermoplastic resin layer 18 is formed of the resin composition containing a particular crosslinking agent, the resultant conductive roll 10 is further less likely to stick to the photosensitive drum.

The conductive roll 10 having the above-described excellent characteristics will be produced by the following method.

Initially, a cylindrical laminar body is formed by using the above-described conductive rubber composition for the conductive rubber foam layer 14, and the semi-conductive rubber composition for the semi-conductive rubber layer 16. This cylindrical laminar body has an unvulcanized, unfoamed rubber layer (which will be foamed later) as an inner layer that gives the conductive rubber foam layer 14, and an unvulcanized, non-foaming rubber layer as an outer layer which gives the semi-conductive solid rubber layer 16.

The cylindrical laminar body is desirably formed by first forming by extrusion a two-layered elongate tube formed of the above conductive rubber composition and semi-conductive rubber composition, and then cutting the tube into segment each having a predetermined length. While the cylindrical laminar body may be formed by other methods, the above method is advantageous in that a large number of cylindrical laminar bodies can be continuously formed one by one, and each layer of the obtained laminar body has considerably uniform dimensions as measured in the axial and circumferential directions. The cylindrical laminar body may be also formed by forming separate tubes one of which consists solely of the unvulcanized, unfoamed rubber layer, the other consisting solely of the unvulcanized, non-foaming rubber layer, and then inserting the above-indicated one tube into the other tube.

Figure 2:
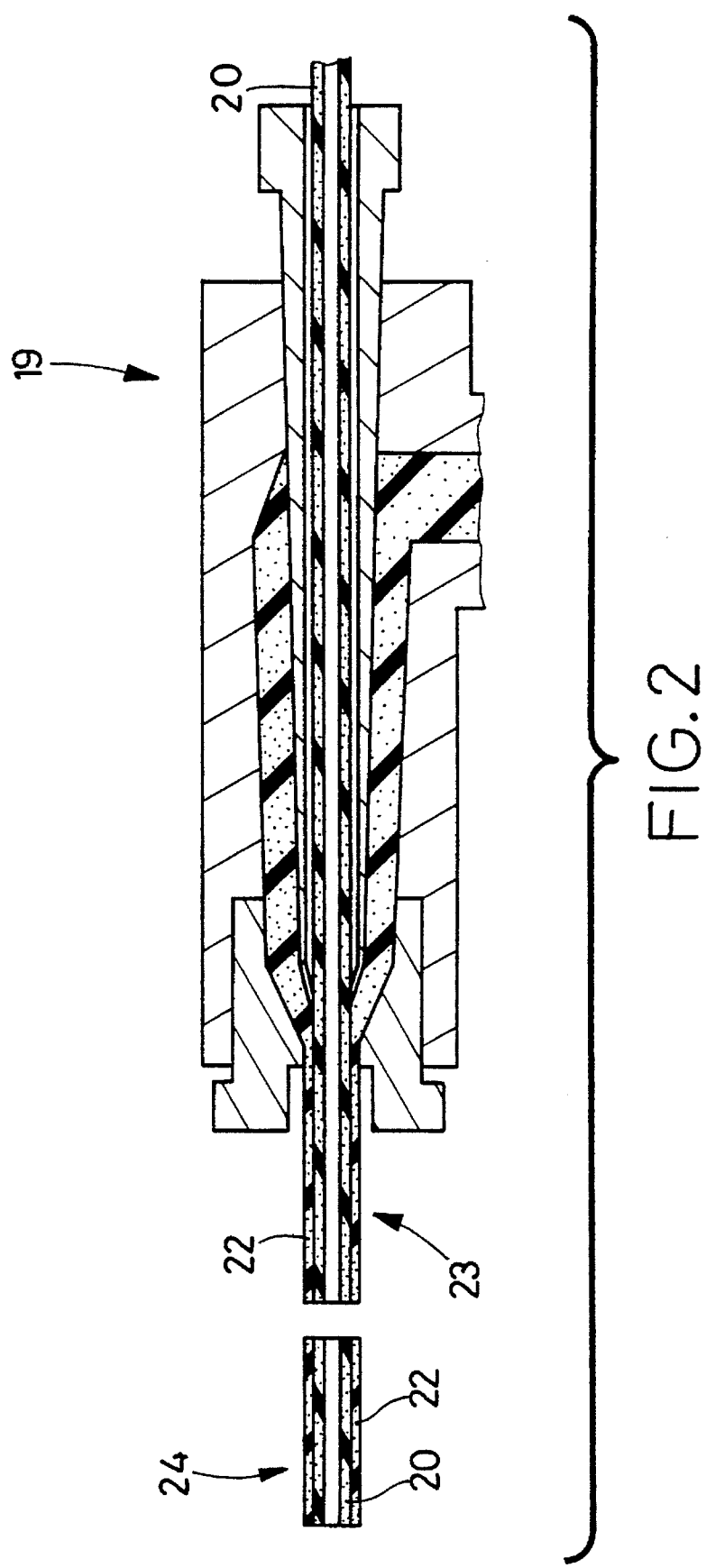
FIG. 2 is a view illustrating one step of the process of producing the conductive roll of FIG. 1, wherein a laminar body having two rubber layers is formed by extrusion.
Figure 3:
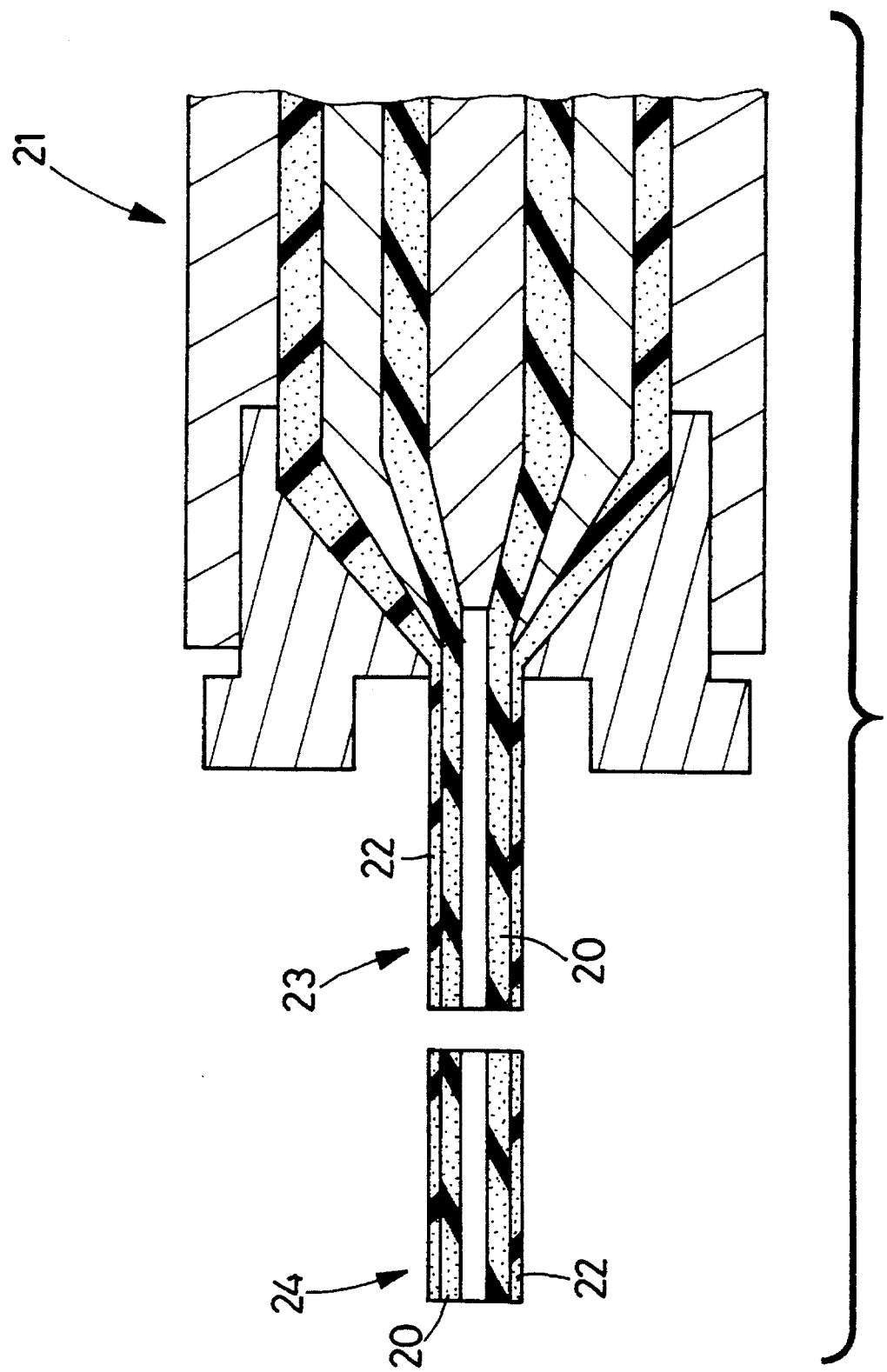
FIG. 3 is a view illustrating the same step of the process of producing the conductive roll of FIG. 1, wherein the two layers of the laminar body are extruded at the same time.

Referring to FIG. 2, when the cylindrical laminar body is formed by extrusion as described above, the unvulcanized, unfoamed rubber layer 20 is initially formed by extrusion into a tubular shape with an extruder (not shown), and the unvulcanized, non-foaming rubber layer 22 is then extruded by an extruder 19 so as to cover the outer circumferential surface of the tube-like rubber layer 20. In this manner, a continuous laminar tube 23 is formed which has an inner layer that consists of the unvulcanized, unfoamed rubber layer 20, and an outer layer that consists of the unvulcanized, non-foaming rubber layer 22. Then, the laminar tube 23 is cut into a plurality of laminar bodies 24 each having a predetermined length. According to another method as shown in FIG. 3, the conductive rubber composition and the semi-conductive rubber composition are concurrently passed through a single extruder 21 which is capable of extruding two tubes at a time, so as to form the laminar tube 23 constructed as described above, which is then cut into the laminar bodies 24. The latter method is advantageous in that the laminar tube 23 which gives the laminar bodies 24 can be formed in one process step wherein two tubes are extruded at a time, thus effectively simplifying the process of forming the laminar bodies 24.

Figure 4:
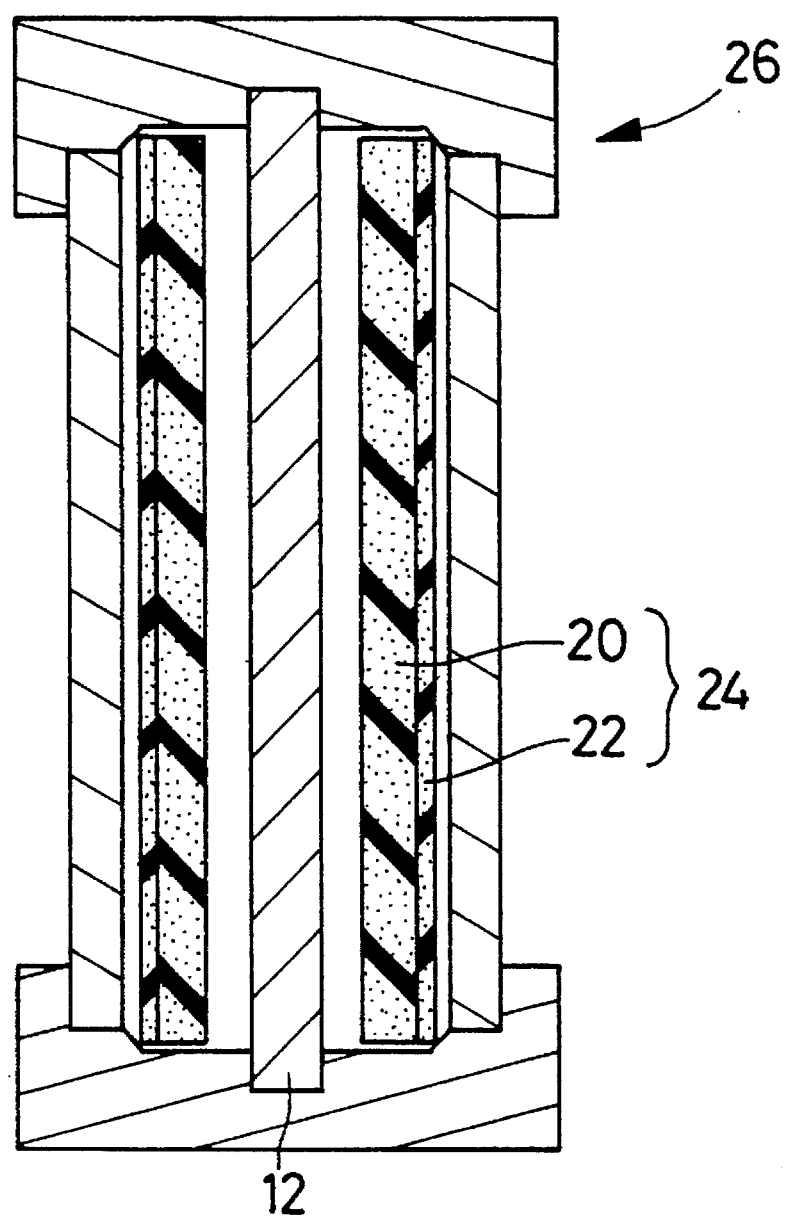
FIG. 4 is a view illustrating another step of the process of producing the conductive roll of FIG. 1, wherein the laminar body is located in a cylindrical metallic mold for subsequent vulcanizing and foaming operation.

The cylindrical laminar body 24 formed by either of the above methods has an inside diameter which larger than the outside diameter of the conductive shaft 12, and an outside diameter which is smaller than the inside diameter of a molding cavity of a cylindrical metallic mold 26 ( FIG. 4.) that will be used for the following vulcanizing and foaming operations. The thus dimensioned laminar body 24 can be placed in position within the cavity of the cylindrical mold 26, as shown in FIG. 4, such that the conductive shaft 12 is located in an inner bore of the laminar body 24. The thickness of each of the unvulcanized, unfoamed rubber layer 20 and the unvulcanized rubber layer 22 is suitably determined so that the conductive rubber foam layer 14 and semi-conductive rubber layer 16 provided by these layers 20, 22 have desired thickness values which are determined depending upon the particular application of the conductive roll 10, for example.

After or before forming the laminar body 24 in the manner as described above, the conductive shaft 12 is positioned at approximately the center of the cavity of the cylindrical metallic mold 26. In this step, a suitable conductive adhesive may be applied as needed to the outer circumferential surface of the conductive shaft 12.

In the next step, the laminar body 24 is positioned within the cavity of the cylindrical metal mold 26, as shown in FIG. 4, such that the laminar body 24 is coaxial or concentric with the conductive shaft 12, and such that suitable clearances are formed between the laminar body 24 and the shaft 12 and between the laminar body 24 and a cylindrical portion of the metal mold 26.

Thereafter, the vulcanizing and foaming operations are concurrently effected by heating, for example, to vulcanize and foam the unvulcanized, unfoamed rubber layer 20 and vulcanize the unvulcanized rubber layer 22, thereby to provide the conductive rubber foam layer 14 and the semi-conductive rubber layer 16, respectively. Since the volume of the unvulcanized, unfoamed rubber layer 20 expands upon foaming thereof, the conductive rubber foam layer 14 is formed integrally with the semi-conductive rubber layer 16 and the conductive shaft 12, so as to provide a desired conductive roll 10.

In the above-described method of producing the conductive roll 10, the conductive rubber foam layer 14 as the base layer and the semi-conductive rubber layer 16 as the resistance adjusting layer are formed without effecting any coating operation, thus eliminating the conventional problems, such as sagging of a coating liquid during the coating operation, or reduced thickness in the end portions of the roll 10. Accordingly, the conductive rubber foam layer 14 and semi-conductive rubber layer 16 assure improved uniformity in the thickness thereof, which leads to improved contact between the roll 10 and the photosensitive drum, and improved resistance to leak (leakage of electric current). In addition, the conductive roll 10 is free from abnormal discharge which may cause defects in reproduced images, and thus assure high and stable operating capability when installed in a copying machine, printer or the like.

Further, the above-described method according to the present invention does not employ any solvent for a coating liquid or slurry, and therefore assures improved safety in the manufacturing process, and increased freedom of choice of the materials for the conductive rubber foam layer 14 and the semi-conductive rubber layer 16. Moreover, the cumbersome drying step and control of the viscosity for the coating liquid can also be eliminated, resulting in simplified equipment for forming the rubber layers 14, 16.

According to the method of the present invention, therefore, the conductive roll 10 having the above-described excellent characteristics can be easily and safely produced.

Further, according to the method of the present invention, the surface of the obtained conductive roll 10 is formed so as to conform to the inner circumferential surface of the cylindrical metal mold 26, due to the volume expansion of the unvulcanized, unfoamed rubber layer 20 upon foaming thereof. Accordingly, the smoothness of the surface of the conductive roll 10 can be advantageously enhanced by increasing the flatness or smoothness of the inner circumferential surface of the metal mold 26, thus eliminating the necessity of grinding the roll surface after the vulcanizing and foaming operations. This eventually reduces the number of steps required for producing the present conductive roll 10.

To form the semi-conductive thermoplastic resin layer 18 on the outer surface of the semi-conductive rubber layer 16 of the conductive roll 10 as described above, the resin composition for the thermoplastic resin layer 18 is dissolved in a solvent, such as alcohol, to provide a coating liquid whose viscosity is suitably controlled, and the coating liquid is applied to the outer surface of the rubber layer 16 by a known coating method, such as dipping. The thus formed semi-conductive thermoplastic resin layer 18 is formed with a considerably small thickness, without causing the problem of sagging of the coating liquid, for example, during the coating operation.

Figure 5:
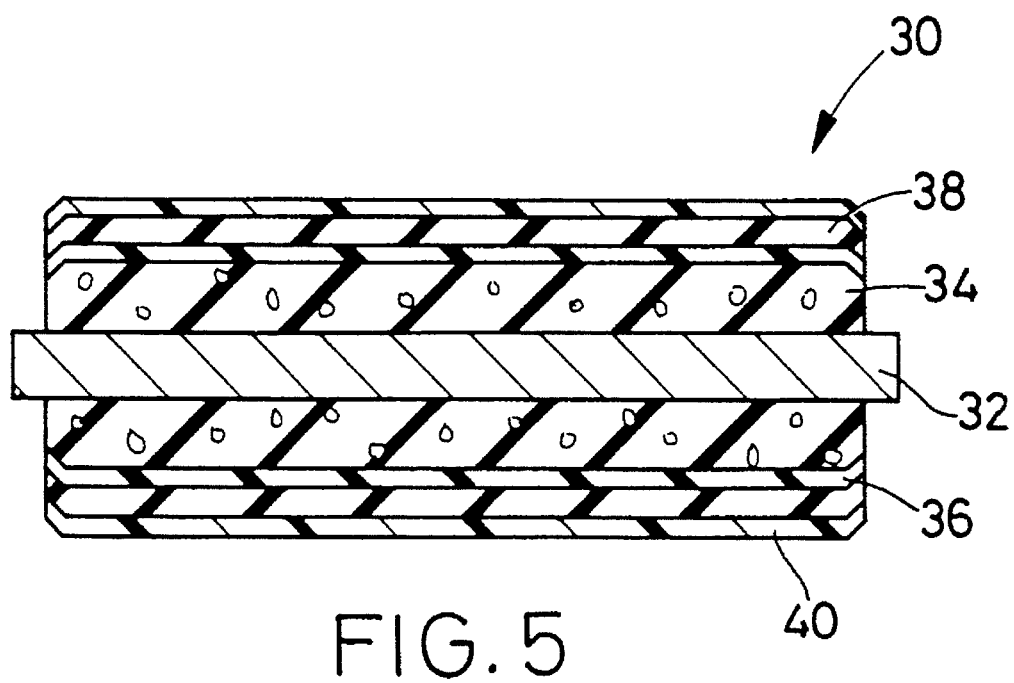
FIG. 5 is a view corresponding to that of FIG. 1, showing another embodiment of the conductive roll of the present invention.
Figure 6:
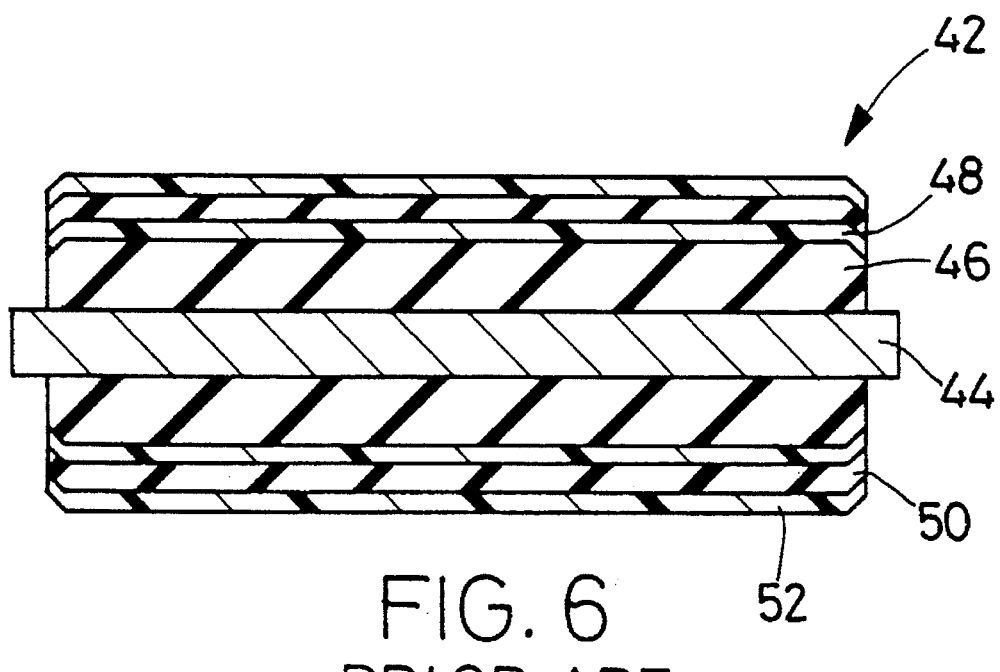
FIG. 6 is a view corresponding to that of FIG. 1, showing a conventional conductive roll.

Referring next to FIG. 5 showing another embodiment of the present invention, a conductive roll 30 includes a conductive shaft 32, a semi-conductive rubber foam layer 34 formed on the outer circumferential surface of the shaft 32, a conductive solid rubber layer 36, and semi-conductive solid rubber layer 38.

The conductive shaft 32 of the conductive roll 30 is formed of a material similar to that of the conductive shaft 12 of the above-described conductive roll 10. The semi-conductive rubber layer 38 is formed of a material similar to that of the semi-conductive rubber layer 16 of the roll 10.

The semi-conductive rubber foam layer 34 formed on the outer surface of the conductive shaft 32 is formed of a semi-conductive rubber composition which contains the foaming agent as indicated above, and an ion-conductive material which makes the foam layer 34 ion-conductive. The content of the ion-conductive material is desirably determined such that the foam layer 34 has a volume resistivity of $10^6$–$10^9$ $\Omega$cm. In this case, the semi-conductive rubber foam layer 34 containing the ion-conductive material provides a uniform electrical resistance, and does not suffer from an increase in the hardness thereof, which increase may be induced by use of conductive particles.

The conductive solid rubber layer 36 formed on the outer surface of the semi-conductive rubber foam layer 34 is formed of a conductive rubber composition that is obtained by removing the foaming agent from the material of which the conductive rubber foam layer 14 of the conductive roll 10 of the previous embodiment is formed. The content of the conductive particles in the conductive rubber layer 36 is desirably controlled such that the rubber layer 36 has a volume resistivity of not greater than $10^6$ $\Omega$cm, so as to assure high uniformity in its electrical characteristics.

In this conductive roll 30, the semi-conductive rubber layer 38 functions as a resistance adjusting layer, and the semi-conductive rubber foam layer 34 and the conductive rubber layer 36 cooperate with each other to function as a base layer.

The thus constructed conductive roll 30 offers the same effects as provided by the above-described conductive roll 10.

Preferably, a semi-conductive thermoplastic resin layer 40 which serves as a protective layer is formed by coating on the outer circumferential surface of the semi-conductive rubber layer 38 of the conductive roll 30, as shown in FIG. 5. This semi-conductive thermoplastic resin layer 40 is formed of a material similar to that of the semi-conductive thermoplastic resin layer 18 of the conductive roll 10 of the first embodiment. This thermoplastic resin layer 40 advantageously reduces the stickiness or tackiness of the surface of the conductive roll 30, and effectively prevents components of the semi-conductive rubber layer 38 as the resistance adjusting layer from transferring to the roll surface.

The thus constructed conductive roll 30 is produced in the same manner as the conductive roll 10, except that the laminar structure consisting of three rubber layers 34, 36, 38 is formed on the outer surface of the conductive shaft 32.

Initially, a cylindrical laminar structure is formed by using the above-described three kinds of rubber compositions for the semi-conductive rubber foam layer 34, conductive rubber layer 36 and semi-conductive rubber layer 38. This laminar structure has an unvulcanized, unfoamed rubber layer as an inner layer which gives the semi-conductive rubber foam layer 34, and an unvulcanized, non-foaming conductive rubber layer as an intermediate layer which gives the conductive rubber layer 36, and an unvulcanized, non-foaming rubber layer as an outer layer which gives the semi-conductive rubber layer 38. Then, the thus obtained laminar structure is placed in position within a molding cavity of a cylindrical metallic mold, with the conductive shaft 32 inserted in an inner bore of the laminar structure. Thereafter, the laminar structure is subjected to simultaneous vulcanizing and forming operations by heating, for example, so as to provide the intended conductive roll 30. In this embodiment, too, the unvulcanized, unfoamed laminar structure consisting of the above three layers has an inside diameter which is larger than the outside diameter of the conductive shaft 32, and an outside diameter which is smaller than the inside diameter of the cavity of the cylindrical metal mold. It is also preferable to form the laminar structure by extruding the above-indicated three rubber layers at the same time.

The above-described method of producing the conductive roll 30 having the semi-conductive rubber foam layer 34, conductive rubber layer 36, and semi-conductive rubber layer 38 formed in this order on the conductive shaft 32 does not include any coating operation which uses a solvent, and therefore yield the same effects as obtained by the method of producing the conductive roll 10.

EXAMPLES

To further clarify the principle of the present invention, there will be described in detail some examples of the conductive roll constructed according to the present invention. However, it is to be understood that the present invention is by no means limited to the details of these examples, but may be embodied with various changes, modifications and improvements which may occur to those skilled in the art, without departing from the scope of the invention.

EXAMPLE 1

Initially, a conductive rubber composition for forming a conductive rubber foam layer was prepared by adding 22 parts by weight of carbon black as conductive particles to 100 parts by weight of ethylene-propylene rubber, and further adding 15 parts by weight of dinitroso pentamethylene tetramine as a foaming agent and suitable amounts of additives, such as a vulcanizing agent.

On the other hand, a semi-conductive rubber composition for forming a semi-conductive solid rubber layer was prepared by adding 0.5 parts by weight of trimethyloctadecyl ammonium perchlorate as quaternary ammonium salt which serves as an ion-conductive material to 100 parts by weight of epichlorohydrin ethylene-oxide rubber, and further adding suitable amounts of additives, such as a vulcanizing agent.

Then, a coating liquid for forming a semi-conductive thermoplastic resin layer was prepared by dispersing conductive stannic oxide in a solution in which 8-nylon was dissolved in a suitable amount of methanol, such that the resultant coating liquid contained 65 parts by weight of the stannic oxide per 100 parts by weight of 8-nylon.

Suitable amounts of the thus prepared conductive rubber composition and semi-conductive rubber composition were passed through respective extruders, to form by extrusion a tube which consists solely of an unvulcanized, unfoamed rubber layer 20 having an inside diameter of 8 mm and an outside diameter of 10 mm, and then form by extrusion a 0.3 mm-thickness, unvulcanized, non-foaming rubber layer 22 to cover the outer circumferential surface of the tube, as shown in FIG. 2. Thus, there is obtained a continuous laminar tube 23 which has an inner layer in the form of the unvulcanized, unfoamed rubber layer 20, and an outer layer in the form of the unvulcanized, non-foaming rubber layer 22. Thereafter, the laminar tube 23 was cut into segments each having a suitable length, to provide a plurality of laminar bodies 24.

Subsequently, an electrically conductive shaft 12 was inserted into an inner bore of each of the thus obtained laminar bodies 24, such that the shaft 12 was disposed coaxially or concentrically with the laminar body 24. The conductive shaft 12 was made of iron and plated with nickel, had an outside diameter of 6 mm, and was coated at its surface with an electrically conductive adhesive. The laminar body 24 with the conductive shaft 12 inserted therein was then positioned within a molding cavity of a cylindricallic metal mold 26 having an inside diameter of 12 mm. Then, the laminar body 24 was heated to be simultaneously vulcanized and foamed, so as to provide a conductive roll in which the conductive rubber foam layer 14 having a volume resistivity of $10^5$ $\Omega$cm, and the semi-conductive rubber layer 16 having a volume resistivity of $10^8$ $\Omega$cm were formed integrally on the outer circumferential surface of the conductive shaft 12.

After the thus obtained conductive roll was taken out of the metallic mold 26, the roll was once immersed in the coating liquid prepared in the above-described manner, lifted up at a fixed speed, and then dried, so that a semi-conductive thermoplastic resin layer 18 was formed on the outer surface of the semi-conductive rubber layer 16. The thus formed semi-conductive thermoplastic resin layer 18 had a thickness of 10 μm, and a volume resistivity of $10^9$ $\Omega$cm. The hardness of this conductive roll, when measured according to a known method, was 49 degrees (Hs: JIS A).

EXAMPLE 2

A conductive roll was obtained as EXAMPLE 2 by forming the laminar body 24 in the same manner as in EXAMPLE 1, except that the two rubber layers 20, 22 were simultaneously extruded as shown in FIG. 3. The hardness of this conductive roll was 49 degrees (Hs: JIS A).

EXAMPLE 3

A conductive rubber composition for forming a conductive rubber foam layer was prepared by adding 25 parts by weight of carbon black as conductive particles to 100 parts by weight of styrene-butadiene rubber, and further adding 18 parts by weight of azodicarbonamide as a foaming agent and suitable amounts of various additives, such as a vulcanizing agent.

Then, a semi-conductive rubber composition for forming a semi-conductive solid rubber layer was prepared by adding 1.0 part by weight of lithium perchlorate as structural charge specific anion which serves as an ion-conductive material to 100 parts by weight of nitrile rubber, and further adding suitable amounts of various additives, such as a vulcanizing agent.

Subsequently, a coating liquid for forming a semi-conductive thermoplastic resin layer was prepared by adding a crosslinking agent containing isocyanate to a solution in which urethane was dissolved in a suitable amount of methyl ethyl ketone, and further dispersing conductive titanium oxide in the solution, such that the obtained coating liquid contained 10 parts by weight of the crosslinking agent and 90 parts by weight of titanium oxide per 100 parts by weight of urethane.

A conductive roll as EXAMPLE 3 was obtained in the same manner as in EXAMPLE 2 by using the thus prepared conductive rubber composition, semi-conductive rubber composition and coating liquid, as well as the conductive shaft made of the same material as used in EXAMPLE 1. In this conductive roll, the conductive rubber foam layer, semi-conductive rubber layer and semi-conductive thermoplastic layer had volume resistivities of $10^5$ $\Omega$cm, $10^8$ $\Omega$cm and $10^9$ $\Omega$cm, respectively. The hardness of the conductive roll was 47 degrees (Hs: JIS A).

EXAMPLE 4

A semi-conductive rubber composition was prepared by adding 30 parts by weight of carbon block as conductive particles and suitable amounts of various additives, such as a vulcanizing agent, to 100 parts by weight of urethane rubber. A conductive roll as EXAMPLE 4 was obtained in the same manner as in. EXAMPLE 2, except that the semi-conductive solid rubber layer was formed of the thus prepared semi-conductive rubber composition. The hardness of the obtained conductive roll was 49 degrees (Hs: JIS A).

EXAMPLE 5

Initially, a semi-conductive rubber composition for forming a semi-conductive rubber foam layer was prepared by adding 2 parts by weight of trimethyloctadecyl ammonium perchlorate as quaternary ammonium salt which serves as an ion-conductive material, to 100 parts by weight of epichlorohydrin ethylene-oxide rubber, and further adding 10 parts by weight of dinitroso pentamethylene tetramine as a foaming agent, and suitable amounts of additives, such as a vulcanizing agent.

Then, a conductive rubber composition for forming a conductive solid rubber layer was prepared by adding 20 parts by weight of carbon black as conductive particles to 100 parts by weight of ethylene-propylene rubber, and further adding suitable amounts of various additives, such as a vulcanizing agent.

Subsequently, a semi-conductive rubber composition for forming a semi-conductive solid rubber layer was prepared by adding 0.2 parts by weight of trimethyloctadecyl ammonium perchlorate as quaternary ammonium salt which serves as an ion-conductive material, to 100 parts by weight of epichlorohydrin ethylene-oxide rubber, and further adding suitable amounts of additives, such as a vulcanizing agent.

Then, a coating liquid for forming a semi-conductive thermoplastic resin layer was prepared by dispersing conductive stannic oxide in a solution in which 8-nylon was dissolved in a suitable amount of methanol, such that the coating liquid contained 65 parts by weight of stannic oxide per 100 parts by weight of 8-nylon.

In the next step, the above-described three kinds of rubber compositions were simultaneously passed through a suitable extruder, so as to form a continuous laminar tube which has an inner layer in the form of an unvulcanized, unfoamed rubber layer which will be foamed to provide the semi-conductive rubber foam layer, an intermediate layer in the form of an unvulcanized, non-foaming conductive rubber layer which gives the conductive rubber layer, and an outer layer in the form of an unvulcanized, non-foaming semi-conductive rubber layer which gives the semi-conductive rubber layer. The inner layer of the laminar tube formed by simultaneous extrusion had an inside diameter of 8 mm and an outside diameter of 10 mm, and the intermediate layer and the outer layer had respective thickness values of 0.1 mm and 0.3 mm. Thereafter, the laminar tube was cut into a plurality of laminar bodies each having a three-layered structure.

Then, each of the thus obtained laminar bodies was positioned with respect to the conductive shaft and cylindrical metal mold as used in EXAMPLE 1, and vulcanized and foamed, so as to provide a conductive roll in which the semi-conductive rubber foam layer, conductive rubber layer, and semi-conductive rubber layer were laminated in this order on the outer circumferential surface of the conductive shaft. These semi-conductive rubber foam layer, conductive rubber layer and semi-conductive rubber layer had volume resistivity of $10^8$ $\Omega$cm, $10^4$ $\Omega$cm and $10^8$ $\Omega$cm, respectively.

The thus obtained conductive roll was then subjected to the coating operation as effected in EXAMPLE 1, using the coating liquid prepared as described above, so that the semi-conductive thermoplastic resin layer was formed on the outer surface of the semi-conductive rubber layer. This thermoplastic resin layer had a thickness of 10 μm and a volume resistivity of $10^9$ $\Omega$cm. The hardness of this conductive roll was 41 degree (Hs: JIS A).

COMPARATIVE EXAMPLE 1

For comparison, a conductive roll was produced by a conventional coating method in the following manner. Initially, a conductive rubber composition for forming a conductive solid rubber layer as a base layer was prepared by adding 25 parts by weight of carbon black as conductive particles to 100 parts by weight of styrene-butadiene rubber, and further adding suitable amounts of additives, such as a vulcanizing agent.

Then, a coating liquid for forming a softener-preventing layer was prepared by adding water-soluble melamine as a crosslinking agent to a solution in which 8-nylon was dissolved in a suitable amount of methanol, and dispersing carbon black in the solution, such that the coating liquid contained 30 parts by weight of the water-soluble melamine and 12 parts by weight of the carbon black per 100 parts by weight of 8-nylon.

Subsequently, a coating liquid for forming a resistance adjusting layer was prepared by adding trimethyloctadecyl ammonium perchlorate to a solution in which epichlorohydrin ethylene-oxide rubber is dissolved in a suitable amount of methyl ethyl ketone, such that the trimethyloctadecyl ammonium perchlorate amounted to 0.2 parts by weight per 100 parts by weight of the epichlorohydrin ethylene-oxide rubber.

Then, a coating liquid for forming a protective layer was prepared by dispersing conductive stannic oxide in a solution in which 8-nylon was dissolved in a suitable amount of methanol, such that the coating liquid contained 65 parts by weight of conductive stannic oxide per 100 parts by weight of 8-nylon.

In the next step, a conductive shaft having an outside diameter of 6 mm was positioned at the center of a molding cavity of a cylindrical metallic mold having an inside diameter of 12 mm. The conductive shaft was made of iron and plated with nickel, and was coated at its surface with a suitable conductive adhesive. Then, the cavity of the cylindrical mold was filled with the conductive rubber composition prepared as described above. This rubber composition was then heated and vulcanized, so as to provide a base roll in which the conductive rubber layer was formed integrally on the outer surface of the conductive shaft.

Subsequently, the thus obtained base roll was taken out of the cylindrical mold, dipped or immersed for a while in the coating liquid for the softener-preventing layer, and lifted up at a fixed speed. After drying by air, the coating liquid was heated so as to form the softener-preventing layer having a thickness of 10 μm and a volume resistivity of $1 \times 10^4$ $\Omega$cm on the outer circumferential surface of the conductive rubber layer as the base layer.

Then, the base roll with the softener-preventing layer formed thereon was subjected to three coating cycles using the previously prepared coating liquid for the resistance adjusting layer, each cycle including dipping, lifting-up and drying steps as described above. Thereafter, the coating layer was cross-linked by heating so as to form the resistance adjusting layer having a thickness of 160 μm and a volume resistivity of $3 \times 10^8$ $\Omega$cm on the outer circumferential surface of the softener-preventing layer.

Finally, the base roll which bears the softener-preventing layer and resistance-adjusting layer thereon was coated with the previously prepared coating liquid for the protective layer, in the manner as described above, so that the protective layer having a thickness of 10 μm and a volume resistivity of $5 \times 10^9$ $\Omega$cm was formed on the outer circumferential surface of the resistance adjusting layer. In this manner, a conductive roll as COMPARATIVE EXAMPLE 1 was obtained. The hardness of the conductive roll was 62 degree (Hs: JIS A).

COMPARATIVE EXAMPLE 2

A conductive roll as COMPARATIVE EXAMPLE 2 was produced in the following manner. Initially, a cylindrical rubber tube was formed by extrusion using the semi-conductive rubber composition for the semi-conductive rubber foam layer as used in EXAMPLE 5, and then cut into a plurality of unvulcanized, unfoamed rubber bodies each having a suitable length. The thus obtained rubber body which gives a semi-conductive rubber foam layer had an inside diameter of 8 mm and an outside diameter of 11 mm. Then, the conductive shaft as used in COMPARATIVE EXAMPLE 1 was inserted into the unvulcanized, unfoamed rubber body, which was in turn inserted into a thermoplastic polyelastomer tube which was formed by extrusion with an outside diameter of 11.5 mm and a thickness of 0.2 mm and which gives a conductive thermoplastic elastomer layer. Thus, a laminar structure having the shaft, rubber body and polyelastomer tube was obtained. This laminar structure was then positioned in the cavity of the cylindrical metallic mold as used in COMPARATIVE EXAMPLE 1, and vulcanized and foamed by heating, to provide a base roll which had a base layer consisting of the semi-conductive rubber foam layer and conductive thermoplastic elastomer layer, and the conductive shaft bearing the base roll thereon.

Then, a softener-preventing layer, resistance adjusting layer and protective layer were formed in this order on the outer circumferential surface of the base roll constructed as described above, by coating the base roll with the coating liquids for forming these layers as used in COMPARATIVE EXAMPLE 1. In this manner, the conductive roll having a hardness of 48 degrees (Hs: JIS A) was obtained.

The thus obtained conductive rolls of EXAMPLES 1 through 5 and COMPARATIVE EXAMPLES 1 through 2 were evaluated in respect of various characteristics in the manners as described below. The results of the evaluation are indicated in TABLE 1 below.

Contact with Photosensitive Drum

Each of the above conductive rolls was brought into contact with a smooth, metallic roll having the same outside diameter (30 mm) as the photosensitive drum, with a load of 500 g being applied to one end of the conductive roll. Then, the metallic roll was rotated with a light source located on one side of the metallic roll and the conductive roll. A nip formed between the metallic roll and the conductive roll was observed from the side opposite to the above-indicated one side, to check if a light from the light source came through a clearance formed between these two rolls. In TABLE 1, O indicates that the light was not seen while indicates that the light was slightly observed through the clearance.

Leak Voltage

The conductive roll was brought into contact with a smooth, metallic roll having the same outside diameter (30 mm) as the photosensitive drum, with a load of 500 g being applied to one end of the conductive roll. In this condition, a DC voltage was applied to the conductive roll, and a voltage at which discharge breakdown took place, that is, a leak voltage, was measured.

Chargeable Voltage

The conductive roll serving as a charging roll was actually installed in a printer ("Laser Jet 4 Printer" manufactured by HEWLETT PACKARD), and AC voltages were measured at respective times when fog disappeared and when a defective image caused by abnormal discharge appeared, with a voltage of XVp-p500 Hz-600 V being applied by an external power source.

Noise

The conductive roll serving as a charging roll was actually installed in a printer ("Laser Jet 4 Printer" manufactured by HEWLETT PACKARD) from which a member for preventing noise of a photosensitive drum was removed. The printer was operated in this condition, to check if the noise was made or not. In TABLE 1, O indicates that no noise occurred, and X indicates that the noise was made.

It will be apparent from TABLE 1 that the conductive rolls of EXAMPLES 1 through 5 were held in contact with the metallic roll with no clearance therebetween, and exhibited apparently higher lead voltage and abnormal discharge voltage than the conductive rolls of COMPARATIVE EXAMPLES 1 and 2. Further, the conductive rolls of EXAMPLES 1–5 made no noise. This means that the conductive roll constructed according to the present invention has a good contact with the photosensitive drum, and high resistance to leak (leakage of electric current), and is also advantageously free from abnormal discharge and noise.

TABLE 1

|  | EXAMPLES | | | | | COMPARATIVE EXAMPLES | |
| --- | --- | --- | --- | --- | --- | --- | --- |
|  | 1 | 2 | 3 | 4 | 5 | 1 | 2 |
| Contact with Photosensitive Drum | o | o | o | o | o | Δ | Δ |
| Leak Voltage (V) | 4.0< | 4.0< | 4.0< | 4.0< | 4.0< | 3.0 | 3.1 |
| Chargeable Voltage |  |  |  |  |  |  |  |
| Fog Disappearing Voltage (V) | 1600 | 1600 | 1600 | 1600 | 1700 | 1600 | 1700 |
| Abnormal Discharge Voltage (V) | 4000< | 4000< | 4000< | 4000< | 4000< | 2700 | 3500 |
| Noise | o | o | o | o | o | X | o |

What is claimed is:

1. A conductive roll comprising:

a conductive shaft;

a rubber foam layer formed on an outer circumferential surface of said conductive shaft; and a semi-conductive solid rubber layer provided radially outwardly of said rubber foam layer.

2. A conductive roll according to claim 1, wherein said rubber foam layer consists of a conductive rubber foam layer, and said semi-conductive solid rubber layer is formed on an outer circumferential surface of said conductive rubber foam layer.

3. A conductive roll according to claim 1, wherein said rubber foam layer consists of a semi-conductive rubber foam layer.

4. A conductive roll according to claim 3, further comprising a conductive solid rubber layer interposed between said semi-conductive rubber foam layer and said semi-conductive solid rubber layer.

5. A conductive roll comprising:
   a conductive shaft;
   a conductive rubber foam layer formed on an outer circumferential surface of said conductive shaft; and
   a semi-conductive solid rubber layer formed on an outer circumferential surface of said conductive rubber foam layer.

6. A conductive roll according to claim 5, further comprising a semi-conductive thermoplastic resin layer formed by coating on an outer circumferential surface of said semi-conductive solid rubber layer, said semi-conductive thermoplastic resin layer being made principally of a composition which contains one of a thermoplastic resin containing conductive particles dispersed therein, and said thermoplastic resin further containing a crosslinking agent.

7. A conductive roll according to claim 5, wherein said conductive rubber foam layer contains conductive particles, and has a volume resistivity of not greater than $10^6$ Ωcm.

8. A conductive roll according to claim 7, wherein said conductive particles comprise one of carbon black, graphite, a metal powder and a conductive metal oxide.

9. A conductive roll according to claim 5, wherein said semi-conductive solid rubber layer contains an ion-conductive material, and a volume resistivity of $10^6$ Ωcm – $10^{10}$ Ωcm.

10. A conductive roll according to claim 9, wherein said ion-conductive material is selected from the group consisting of quaternary ammonium salts including trimethyloctadecyl ammonium perchlorate and benzyltrimethyl ammonium chloride, and structural charge specific anions including lithium perchlorate and potassium perchlorate.

11. A conductive roll comprising:
    a conductive shaft;
    a semi-conductive rubber foam layer formed on an outer circumferential surface of said conductive shaft;
    a conductive solid rubber layer formed on an outer circumferential surface of said semi-conductive rubber foam layer; and
    a semi-conductive solid rubber layer formed on an outer circumferential surface of said conductive solid rubber layer.

12. A conductive roll according to claim 11, further comprising a semi-conductive thermoplastic resin layer formed by coating on an outer circumferential surface of said semi-conductive solid rubber layer, said semi-conductive thermoplastic resin layer being made principally of a composition which contains one of a thermoplastic resin containing conductive particles dispersed therein, and said thermoplastic resin further containing a crosslinking agent.

13. A conductive roll according to claim 11, wherein said semi-conductive rubber foam layer contains an ion-conductive material, and a volume resistivity of $10^6$ Ωcm–$10^9$ Ωcm.

14. A conductive roll according to claim 11, wherein said conductive solid rubber layer contains conductive particles, and has a volume resistivity of not greater than $10^6$ Ωcm.

15. A conductive roll according to claim 11, wherein said semi-conductive solid rubber layer contains an ion-conductive material, and a volume resistivity of $10^6$ Ωcm –$10^{10}$ Ωcm.

* * * * *